(12) United States Patent
Norton et al.

(10) Patent No.: US 7,971,053 B2
(45) Date of Patent: *Jun. 28, 2011

(54) METHODS, SYSTEMS, AND PRODUCTS FOR INTRUSION DETECTION

(75) Inventors: Stephen Pancoast Norton, Conyers, GA (US); Chris Burchfield, Decatur, GA (US); Rick J. Frataccia, Newnan, GA (US); Gary O Gibson, Sr., Acworth, GA (US); David Prince, Flowery Branch, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 835 days.

This patent is subject to a terminal disclaimer.

(21) Appl. No.: 10/854,478

(22) Filed: May 26, 2004

(65) Prior Publication Data

US 2005/0268337 A1 Dec. 1, 2005

(51) Int. Cl.
*H04L 29/06* (2006.01)
(52) U.S. Cl. .................... 713/153; 235/492; 713/154
(58) Field of Classification Search .............. 713/201, 713/153, 154
See application file for complete search history.

(56) References Cited

U.S. PATENT DOCUMENTS

| | | | | |
|---|---|---|---|---|
| 5,623,601 | A * | 4/1997 | Vu .................................. | 726/12 |
| 6,119,236 | A * | 9/2000 | Shipley .......................... | 726/22 |
| 6,121,922 | A * | 9/2000 | Mohan ..................... | 342/357.75 |
| 6,607,136 | B1 * | 8/2003 | Atsmon et al. ................ | 235/492 |
| 2003/0069961 | A1 * | 4/2003 | Kaushik et al. ............... | 709/224 |
| 2003/0236990 | A1 * | 12/2003 | Hrastar et al. ................ | 713/200 |
| 2005/0157662 | A1 * | 7/2005 | Bingham et al. .............. | 370/254 |
| 2006/0005243 | A1 * | 1/2006 | Norton et al. .................. | 726/23 |

OTHER PUBLICATIONS

Netgear, Inc. Installation Guide for the NETGEAR 54 Mbps Wireless PC Card WG511 MO-WG511NA-0 Feb. 2003.*

* cited by examiner

*Primary Examiner* — Nabil M El Hady
*Assistant Examiner* — Dant B Shaifer Harriman
(74) *Attorney, Agent, or Firm* — Scott P. Zimmerman PLLC

(57) ABSTRACT

Methods, systems, and products are disclosed for detecting an intrusion to a communications network. One embodiment describes a system for detecting intrusions. The system has a peripheral card coupled to a host computer system. The peripheral card has a communications portion and a processor managing the communications portion. The communications portion has only a capability for receiving data packets via a communications network. The communications portion lacks capability of transmitting the data packets via the communications network. The communications portion of the peripheral card reduces intrusion of the communications network.

18 Claims, 6 Drawing Sheets

METHODS, SYSTEMS, AND PRODUCTS FOR INTRUSION DETECTION

This application relates to the commonly-assigned U.S application Ser. No. 10/854,355, concurrently filed herewith and entitled "Methods, Systems, and Products for Intrusion Detection," of which the "Brief Summary Of The Invention" section and the "Detailed Description Of The Invention" section are incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computers and to computer hardware and, more particularly, to reducing intrusions of computer networks.

2. Description of the Related Art

Network intrusion is a grave concern. The term "intrusion" means a "hacker," "cracker," or other person/program is attempting an unauthorized access to a computer and/or a communications network. The intruder typically attempts to remotely penetrate a computer system by accessing the communications network, although system penetration and physical penetration are also known. Intruders can exploit software bugs, mis-configured systems, weak/predictable passwords, and design flaws to penetrate computer systems and networks. Intruders can even utilize "sniffers" to intercept data packets. If an intruder successfully gains access to a computer system and/or network, sensitive/confidential information is in jeopardy. The victim of the intrusion may even be legally liable if reasonable measures were not taken to protect against intruders.

One particular problem is rogue access points. An access point is a computer system that communicates with a network. As more and more computer systems utilize wireless access, network security has become a greater problem. If even one authorized user gains access using a wireless connection, that same wireless connection may be exploited by many unauthorized users. Despite a security administrator's best efforts, these "rogue" access points destroy all control over the perimeter of the network. These "rogue" access points, using easily purchased and configured wireless networking products, pose a great risk of loss of corporate intellectual property. There is, accordingly, a need in the art for methods, systems, and products for detecting intrusions of networks, for detecting wireless rogue access points and stations, for detecting malicious probing and unauthorized access, for detecting mis-configured access points and stations, and for detecting ad-hoc stations.

BRIEF SUMMARY OF THE INVENTION

The aforementioned problems, and other problems, are reduced by this invention. This invention comprises methods, computer systems, computer programs, and computer program products that detect intrusions of a communications network. This invention uses peripheral cards with limited capabilities to help reduce rogue access to communications networks. These peripheral cards are used in network access points and limit the ability of any potential rogue client to obtain information from the network. The peripheral cards have only one-way communications capability. A network access point, for example, may include a peripheral card that can only receive data from the network. The peripheral card has no ability to send data to the network. This limited, one-way communications capability helps reduce unauthorized network intrusions. This limited, one-way communications capability also helps prevent a rogue client from downloading sensitive/proprietary information.

This invention discloses methods, systems, and products for detecting an intrusion to a communications network. One embodiment describes a system for detecting intrusions. The system has a peripheral card coupled to a host computer system. The peripheral card has a communications portion and a processor managing the communications portion. The communications portion has only a capability for receiving data packets via a communications network. The communications portion lacks capability of transmitting the data packets via the communications network. The communications portion of the peripheral card reduces intrusion of the communications network.

The embodiments may also include an Intrusion Detection Module. This Intrusion Detection Module stores in memory of the host computer system. The Intrusion Detection Module compares the content of a data packet to a database of registered clients and hosts and to a set of rules. If the data packet satisfies the set of rules, the data packet is ignored. If, however, the data packet fails to satisfy the set of rules, the Intrusion Detection Module triggers an intrusion alert.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein.

These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention detects intrusions of a communications network. This invention comprises methods, computer systems, computer programs, and computer program products that detect intrusions of a communications network. This invention uses peripheral cards with limited capabilities to help reduce rogue access to communications networks. These peripheral cards are used in network access points and limit the ability of any potential rogue client to obtain information from the network. The peripheral cards have only one-way communications capability. A network access point, for example, may include a peripheral card that can only receive data from the network. The peripheral card has no ability to send data to the network. This limited, one-way communications capability helps reduce unauthorized network intrusions. This limited, one-way communications capability also helps prevent a rogue client from accessing a network and downloading sensitive/proprietary information.

Figure 1:
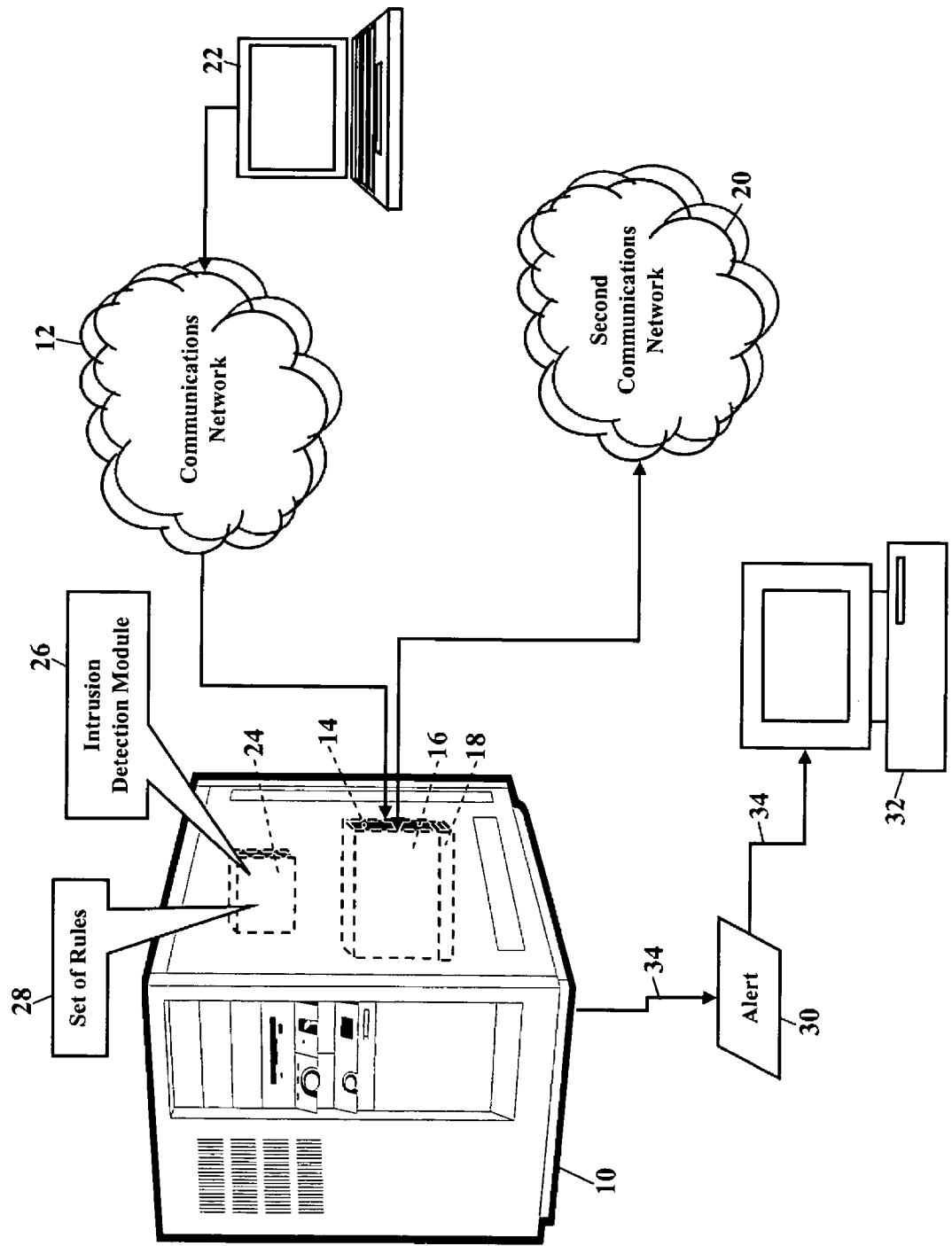
FIG. 1 is a schematic illustrating one of the operating environments for the embodiments of this invention.

FIG. 1 is a schematic illustrating one of the operating environments for the embodiments of this invention. FIG. 1 shows a host computer system 10 coupled to a first communications network 12 via a peripheral card 14. The peripheral card 14 provides a communications interface between the host computer system 10 and the communications network 12. The peripheral card 14 is sometimes referred to as a "Network Interface Card" ("NIC") or "Network Interface Device" ("NID"). However the peripheral card 14 is commonly described, the term "peripheral card," as used herein, describes any device or technology that is capable of providing a connection to the communications network 12. As those of ordinary skill in the art understand, the peripheral card 14 is generally a circuit board/card 16 installed in an expansion slot 18 of the host computer system 10. The peripheral card 14, however, could also be embodied for use in a digital/analog modem (not shown for simplicity).

The peripheral card 14 helps protect against rogue access. Although the peripheral card 14 provides a communications interface between the host computer system 10 and the communications network 12, the peripheral card 14 of this invention only has capability for receiving data packets from the communications network 12. That is, the peripheral card 14 of this invention lacks any capability of transmitting data packets to the communications network 12. The peripheral card 14, then, can receive data packets from the communications network 12, but the peripheral card 14 cannot transmit/send/forward data packets from the host computer system 10 to the communications network 12. As the following paragraphs explain, because the peripheral card 14 lacks the capability of transmitting data packets to the communications network 12, there is less chance of an intruder hacking into the host computer system 10.

The peripheral card 14 also helps prevent rogue access to protected networks. As those of ordinary skill in the art understand, the host computer system 10 may itself communicate with multiple other communications networks. FIG. 1, for example, shows the host computer system 10 communicating with a second communications network 20. That is, the host computer system 10 communicates with both the communications network 12 and the second communications network 20. The peripheral card 14 provides a communications interface between the host computer system 10 and the communications network 12. The peripheral card 14 also provides a communications interface between the host computer system 10 and the second communications network 20. While the second communications network 20 can be any network, the second communications network 20 is typically a secured network, such as a local area network ("LAN"), a wide-area network ("WAN"), a corporate network, or other limited-access network. As the following paragraphs explain, because the peripheral card 14 lacks the capability of transmitting data packets to the communications network 12, there is less chance of an intruder compromising the host computer system 10 and hacking into the second communications network 20.

The peripheral card 14 helps prevent intrusion of the second communications network 20. Even if a rogue client 22 is able to compromise the host computer system 10, the peripheral card 14 prevents the rogue client 22 from receiving data packets from the host computer system 10. The peripheral card 14, as earlier mentioned, can receive data packets from the communications network 12. The peripheral card 14, however, cannot transmit/send/forward data packets from the host computer system 10 to the communications network 12. The rogue client 22, then, is prevented from downloading data packets from either communications network 12 and/or the second communications network 20 via the host computer system 10. So, even if the rogue client 22 somehow compromises the host computer system 10, the rogue client 22 is still unable to download data packets. If, for example, sensitive information is accessible via the second communications network 20, the peripheral card 14 would not provide the capability to download this sensitive information.

The host computer system 10 may also "sniff" data packets. Because the peripheral card 14 can only receive data packets, the host computer system 10 acts as an intrusion detection system. As the peripheral card 14 receives the data packets from the communications network 12, the host computer system 10 stores the data packets in memory 24. An Intrusion Detection Module 26, also stored in the memory 24, then inspects, or "sniffs," the data packets. The Intrusion Detection Module 26 is a software program that inspects the header portion and/or the payload portion of each data packet. The header portion and/or the payload portion are then compared against a set 28 of rules stored in the memory 24. The Intrusion Detection Module 26 uses the set 28 of rules to determine an occurrence of an intrusion event. If a data packet satisfies the set 28 of rules, the data packet is "good" and ignored. If, however, a data packet fails to satisfy the set 28 of rules, the data packet is "bad." That is, the failing data packet signifies an intrusion event. An alert 30 is communicated to a main console 32 via a dedicated and/or encrypted communications path 34. The main console 32 is itself a computer system that monitors the current status of the communications network 12 and/or the second communications network 20. The main console 32 provides a visual and/or audible indication of the alert 30. Security measures can be taken to sever the rogue client 22, and security personnel can even be dispatched to intercept violators when they occur.

Figure 2:
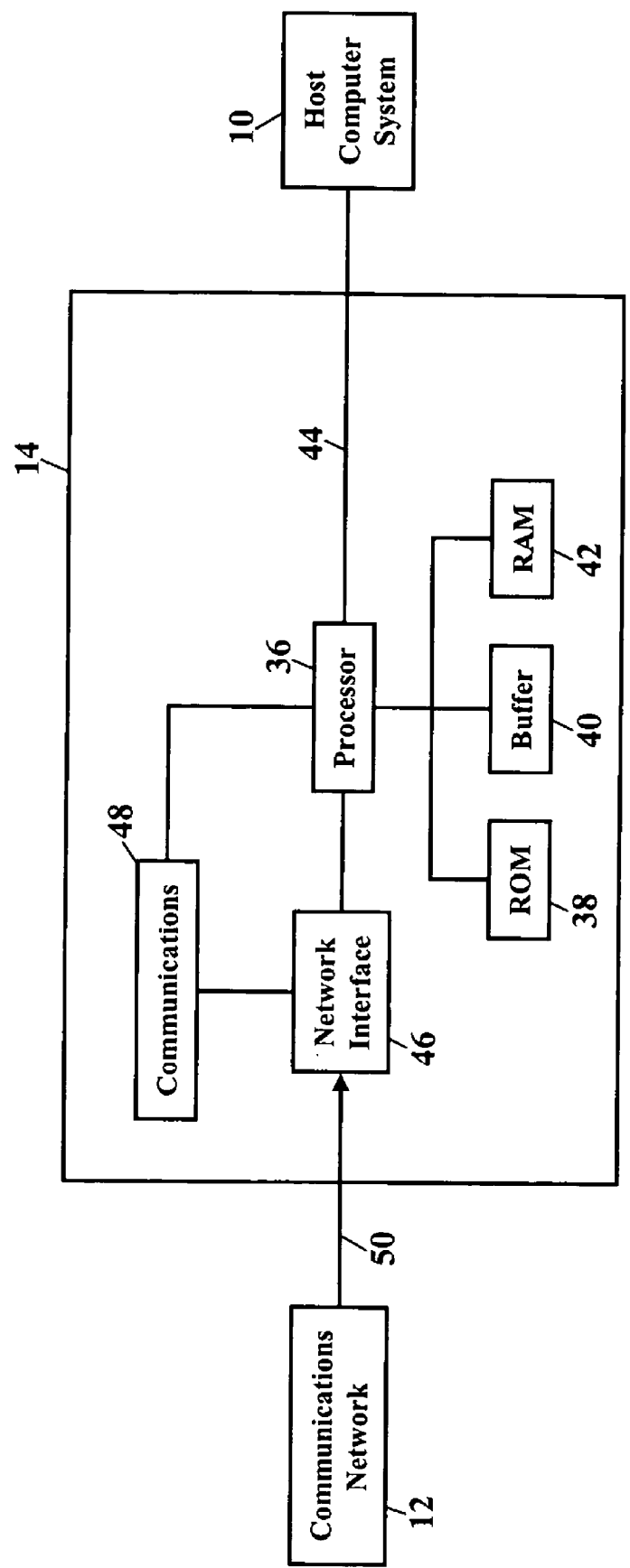
FIG. 2 is an exemplary block diagram of the peripheral card 14 shown in FIG. 1, according to more embodiments of this invention.

FIG. 2 is an exemplary block diagram of the peripheral card 14 shown in FIG. 1, according to more embodiments of this invention. The peripheral card 14 provides a communications interface between the host computer system 10 and the communications network 12. The peripheral card 14 has a processor 36 controlling operation of the peripheral card 14. The processor 36 may be a microprocessor and/or a digital signal processor. The processor 36 may transfer data to/from various memory devices, such as a Read-Only Memory (ROM) 38, a buffer memory 40, and a Random Access Memory (RAM) 42. One or more of the memory devices may store data and instructions. The processor 36 may also perform initialization functions, diagnostic functions, error detection functions, and security functions. The processor 36 communicates with the host computer 10 via a communications path 44. The communications path 44 couples the peripheral card 14 to the host computer system 10, and the communications path 44 may include a Peripheral Component Interconnect (PCI-compatible) connection, a Personal Computer Memory Card International Association (PCMCIA-compatible) connection, and/or a Universal Serial Bus (USB-compatible) connection.

The peripheral card 14 may also include a network interface portion 46 and a communications portion 48. The network interface portion 46 maintains a network connection 50 between the communications network 12 and the host computer system 10. The network connection 50 may include a coaxial cable connection, a copper-pair connection, and/or a fiber optic connection. The communications portion 48 restricts the communications capability of the peripheral card 14. The communications portion 48 restricts the peripheral card 14 to only the capability of receiving data packets from the communications path 44. The communications portion 48 lacks capability of transmitting data packets to the communications network 12 via the communications path 44.

Figure 3:
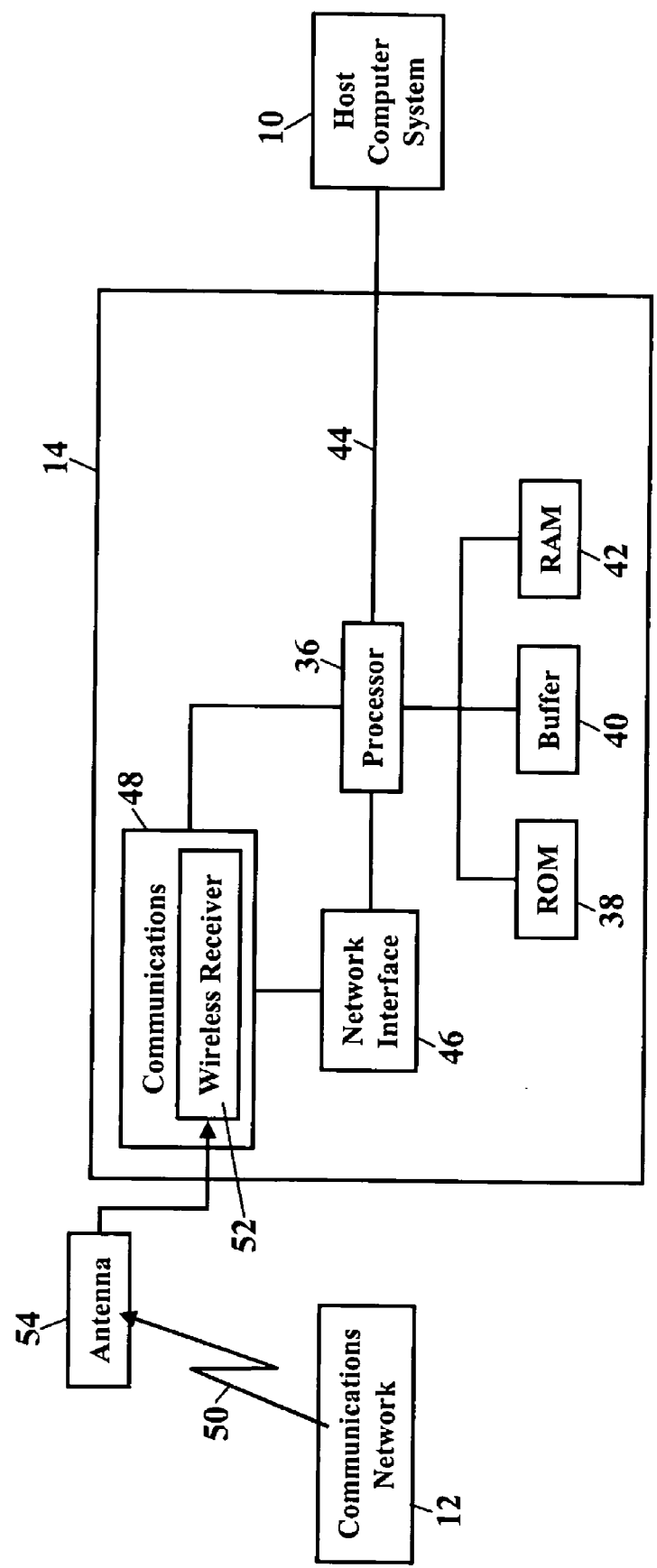
FIG. 3 is an alternative exemplary block diagram of the peripheral card 14 shown in FIG. 1, according to still more embodiments of this invention.

FIG. 3 is an alternative exemplary block diagram of the peripheral card 14 shown in FIG. 1, according to still more embodiments of this invention. Here the network interface portion 46 maintains a wireless network connection 50 between the communications network 12 and the host computer system 10. The communications portion 48 comprises a wireless receiver 52 for wirelessly receiving the data packets via the communications network 12. An antenna 54 couples to the wireless receiver 52. This alternative exemplary block diagram of the peripheral card 14 only has a capability for wirelessly receiving data packets from the communications network 12. The communications portion 48 lacks capability of wirelessly transmitting to the communications network 12. The wireless network connection 50 may utilize any protocol or standard, such as GSM, CDMA, and TDMA signaling standards. The wireless network connection 50 may also utilize the I.E.E.E 802 family of standards, and the wireless connection 50 may use any portion of the electromagnetic spectrum (such as "Bluetooth" ISM technology).

Figure 4:
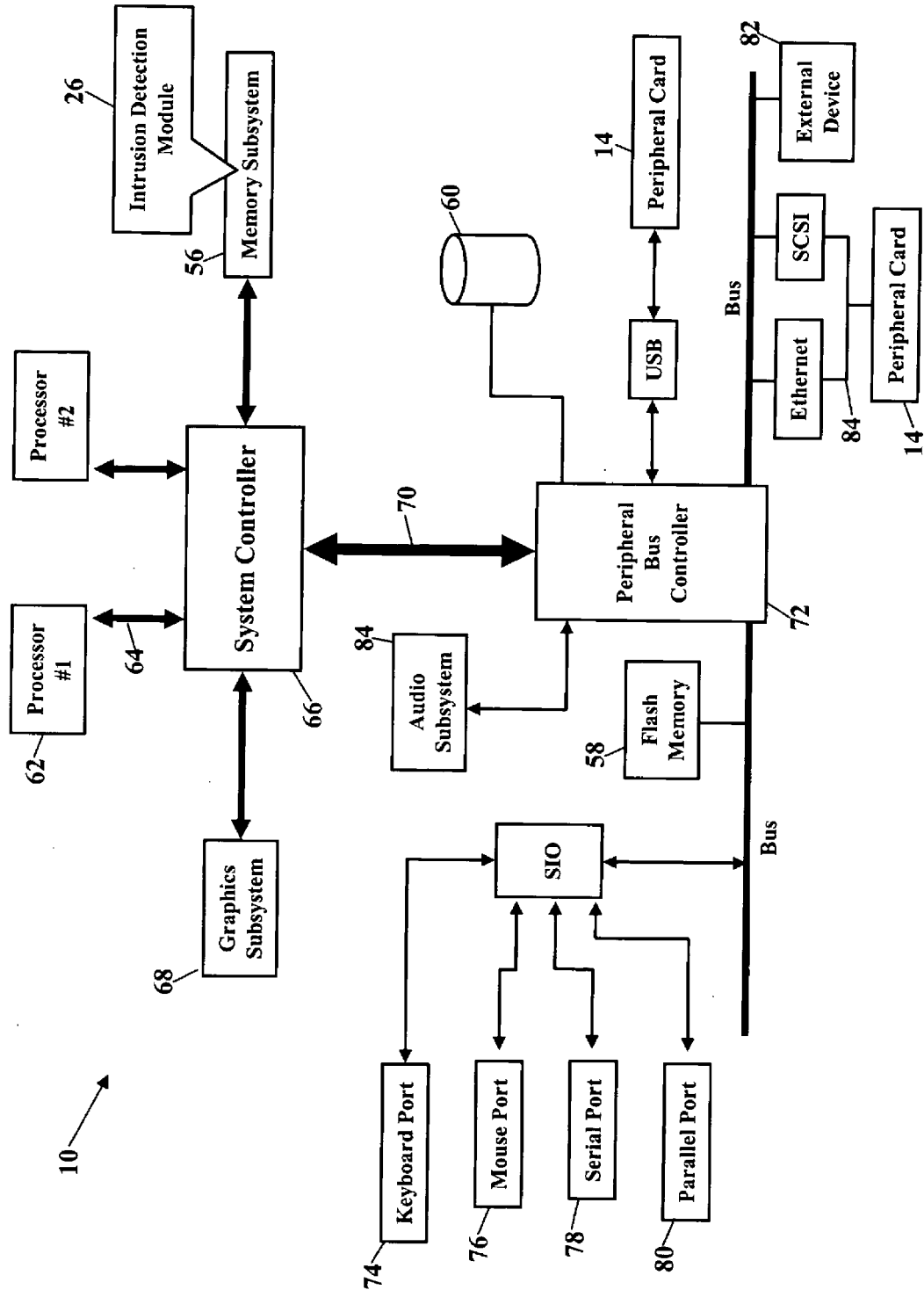
FIGS. 4 and 5 illustrate an alternative operating environment for this invention.
Figure 5:
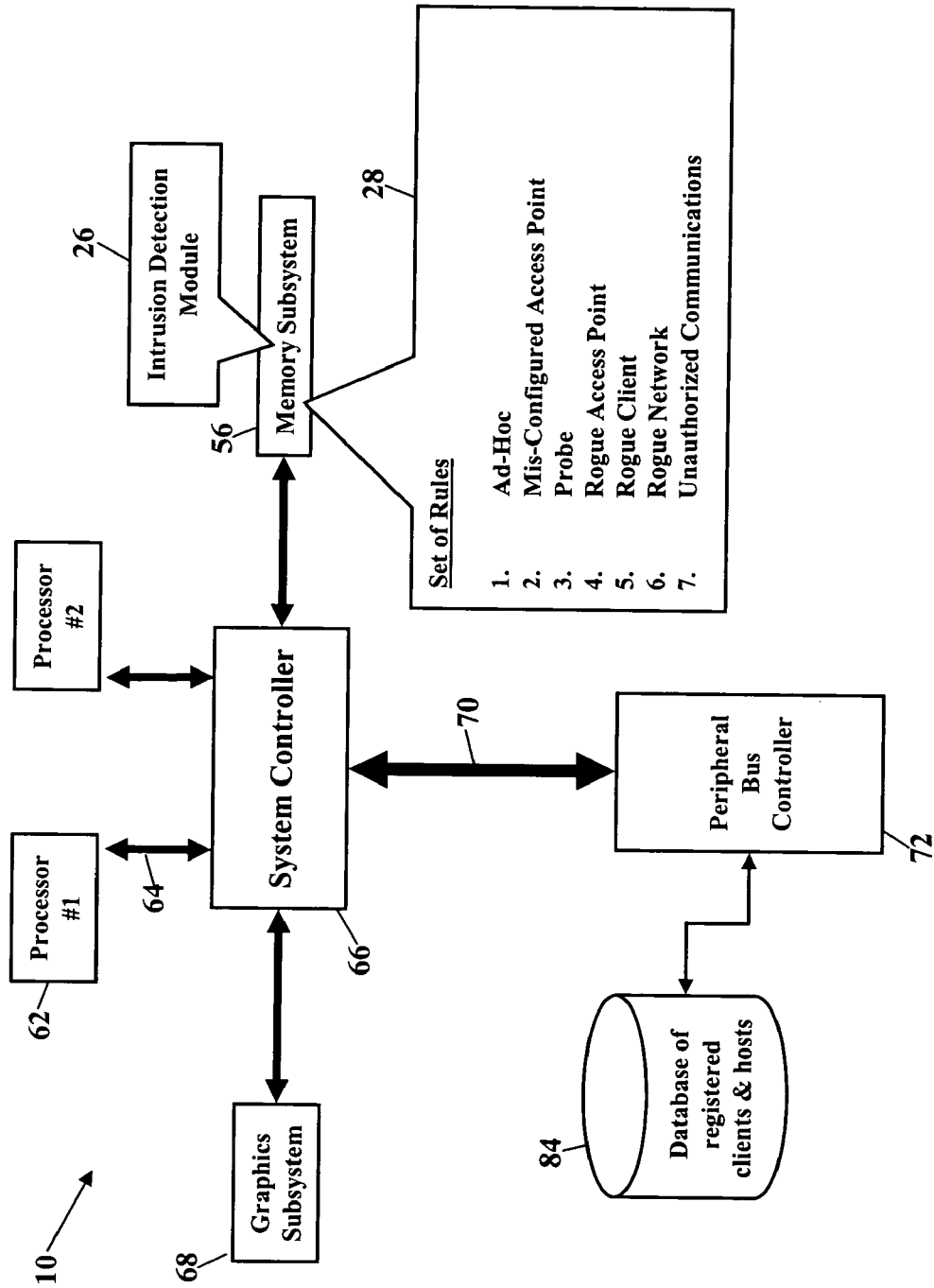

FIGS. 4 and 5 illustrate an alternative operating environment for this invention. FIG. 4 is a block diagram showing the host computer system 10 coupled to the peripheral card 14. As FIG. 4 also shows, the Intrusion Detection Module 26 operates within a system memory device. The Intrusion Detection Module 26, for example, is shown residing in a memory subsystem 56. The Intrusion Detection Module 26, however, could also reside in flash memory 58 or a peripheral storage device 60. The host computer system 10 also has one or more central processors 62 executing an operating system. The operating system, as is well known, has a set of instructions that control the internal functions of the host computer system 10. A system bus 64 communicates signals, such as data signals, control signals, and address signals, between the central processor 62 and a system controller 66 (typically called a "Northbridge"). The system controller 66 provides a bridging function between the one or more central processors 62, a graphics subsystem 68, the memory subsystem 56, and a PCI (Peripheral Controller Interface) bus 70. The PCI bus 70 is controlled by a Peripheral Bus Controller 72. The Peripheral Bus Controller 72 (typically called a "Southbridge") is an integrated circuit that serves as an input/output hub for various peripheral ports. These peripheral ports are shown including a keyboard port 74, a mouse port 76, a serial port 78 and/or a parallel port 80 for a video display unit, one or more external device ports 82, and networking ports 84 (such as SCSI or Ethernet). The Peripheral Bus Controller 72 also includes an audio subsystem 84. Those of ordinary skill in the art understand that the program, processes, methods, and systems described in this patent are not limited to any particular computer system or computer hardware. Other architectures are possible, and the Intrusion Detection Module 26 can operate in any architecture.

Those of ordinary skill in the art also understand the central processor 62 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), Sun Microsystems, Inc. (4150 Network Circle, Santa Clara Calif. 95054, www.sun.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 56, flash memory 58, or peripheral storage device 60) may also contain an application program and a driver. The application program cooperates with the operating system and with a video display unit (via the serial port 78 and/or the parallel port 80) to provide a Graphical User Interface (GUI). The Graphical User Interface typically includes a combination of signals communicated along the keyboard port 74 and the mouse port 76. The Graphical User Interface provides a convenient visual and/or audible interface with a user of the host computer system 10. The driver is a software program that allows the host computer system 10 to communicate with and to command the peripheral card 14.

FIG. 5 is similar to FIG. 4, yet FIG. 5 further illustrates the Intrusion Detection Module 26. The Intrusion Detection Module 26 is dynamically configurable and can reload a configuration file without rebooting the host computer system 10. The Intrusion Detection Module 26 uses the set 28 of rules to inspect each data packet. The Intrusion Detection Module 26 also accesses a database 84 of registered clients and hosts. The database 84 of registered clients and hosts stores a list of known/recognized clients and known/recognized host computer systems. The database 84 of registered clients and hosts would typically contain a unique identifier of each known client and of each known host computer system. The unique identifier may be any information that uniquely identifies the client, the host, and/or the network, although the unique identifier can be each client's Media Access Control ("MAC") address and/or each network's Service Set Identifier ("SSID"). As those of ordinary skill in the art recognize, the MAC address is a Data Link Layer responsible for scheduling and routing data transmissions on a shared network. The MAC address, in particular, is a sub-layer of the I.E.E.E. 802 family of specifications that defines network access methods and framing for wireless networks. The MAC address provides fair and deterministic access to the network, address recognition, and generation and verification of frame check sequences. As those of ordinary skill also recognize, the SSID is a 32-character unique identifier attached to the header of packets wirelessly communicated between devices. The SSID acts as a network name that differentiates one wireless communications network from another. All access points and all devices attempting to connect to a specific wireless communications network should use the same SSID. Without the proper SSID, a wireless device should not be permitted to communicate with the wireless communications network.

The Intrusion Detection Module 26, as earlier mentioned, inspects or "sniffs" the data packets. Because much of FIG. 5 is similar to FIG. 4, FIG. 5 for simplicity eliminates much of the componentry shown in FIG. 4. As the Intrusion Detection Module 26 inspects each data packet, the Intrusion Detection Module 26 consults the database 84 of registered clients and hosts and the set 28 of rules. If a data packet satisfies the set 28 of rules, the data packet is "good" and ignored. If, however, a data packet fails to satisfy the set 28 of rules, the data packet is "bad." The Intrusion Detection Module 26, as explained below, ignores encrypted traffic between a known client and a known host, but the Intrusion Detection Module 26 triggers an alert for other traffic.

FIG. 5 illustrates the set 28 of rules. The set 28 of rules determines the occurrence of the intrusion event (shown as reference numeral 30 in FIG. 1). The set 28 of rules is definable by an authorized administrator and can describe any data packet observation that triggers the intrusion event. FIG. 5 illustrates seven rules describing seven observations.

1. Ad Hoc

Here the Intrusion Detection Module 26 determines that an "ad-hoc" beacon and/or probe resulting from a known or unknown client device.

2. Mis-Configured Access Point

Here the Intrusion Detection Module 26 determines that a known host computer system is not complying with established wireless policies. A business/corporation/individual might have a defined policy regarding wireless networking. The known host, for example, may be broadcasting the SSID. The known host may be using an incorrect service set identifier. Whatever the reason, this observance triggers the intrusion event.

3. Probe

The Intrusion Detection Module 26 determines that a known client device is searching/probing for the SSID of the communications network. If the client does not immediately know the SSID of the communications network, this could indicate a security concern. If the known client is probing for an invalid SSID of the communications network, this could also indicate a security concern.

4. Rogue Access Point

The Intrusion Detection Module 26 determines that an unknown/unregistered access point is sending beacons or responding to probes. This is potentially a security concern and the intrusion event is triggered.

5. Rogue Client

The Intrusion Detection Module 26 determines that an unknown/unregistered client is probing and attempting to communicate. This is potentially a security concern and the intrusion event is triggered.

6. Rogue Network

Here the Intrusion Detection Module 26 detects unknown/unrecognized data packets. This observance most likely indicates a security concern and the intrusion event is triggered.

7. Unauthorized Conversation

The Intrusion Detection Module 26 detects a known host computer system, or a known client device, sending/receiving data packets from unknown client device. The Intrusion Detection Module 26 may also detect a known client device sending/receiving data packets with an unknown access point. The Intrusion Detection Module 26 triggers the intrusion event.

Figure 6:
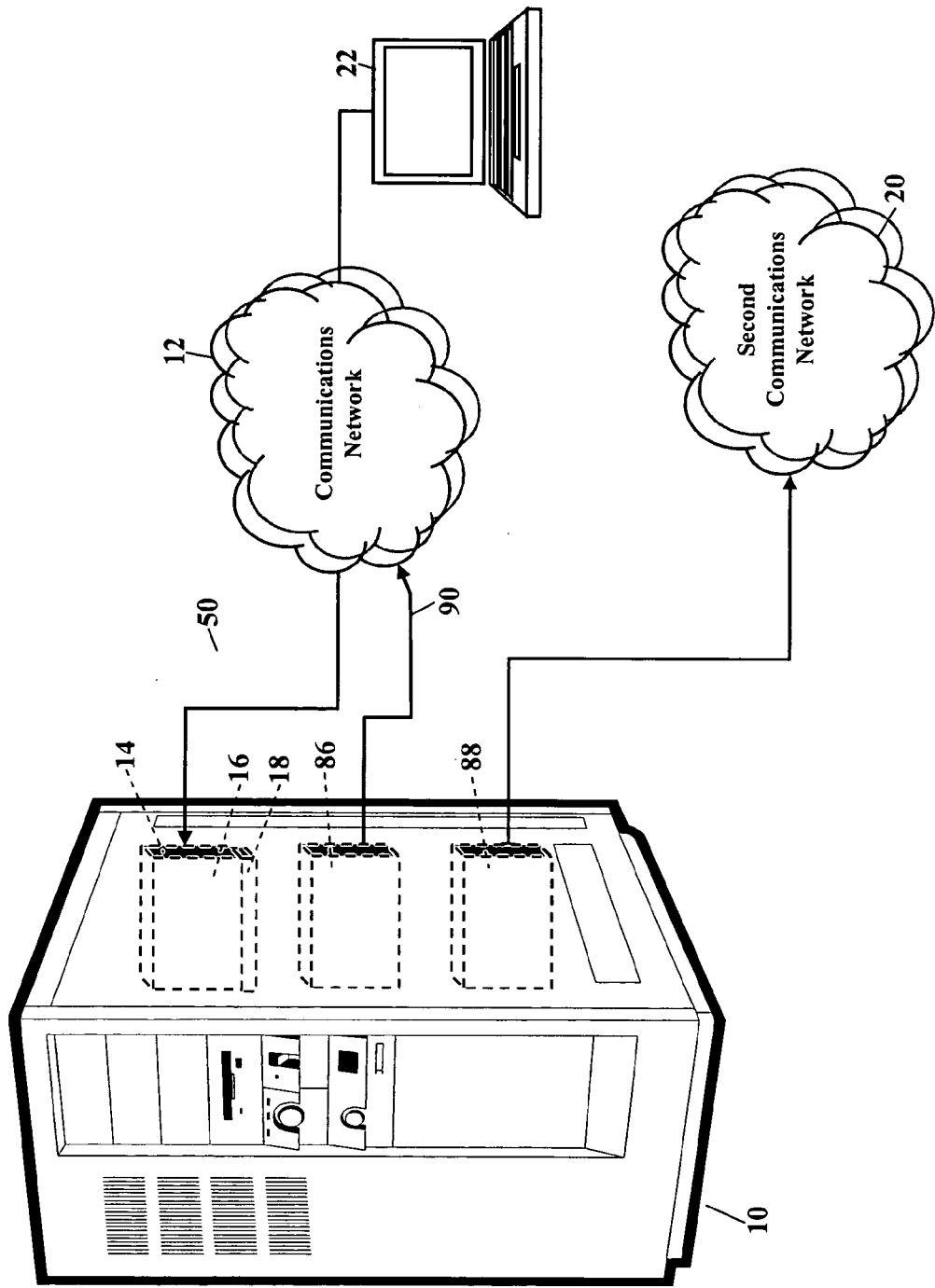
FIG. 6 is a block diagram illustrating the host computer system 10 coupled to multiple peripheral cards to enhance security.

FIG. 6 is a block diagram illustrating the host computer system 10. Here the host computer system 10 couples to multiple peripheral cards to enhance security. The host computer 10 couples to the peripheral card 14, a second peripheral card 86, and a third peripheral card 88. The peripheral card 14 includes the network connection 50 between the communications network 12 and the host computer system 10. The peripheral card 14 has only a capability for receiving data packets from the communications network 12—the peripheral card 14 lacks capability of transmitting data packets to the communications network 12. The third peripheral card 88 provides the network interface functionality. The third peripheral card 88 couples to the host computer system 10 and provides the network connection to the communications network 12 and/or to the second communications network 20.

The second peripheral card 86 can only transmit. The second peripheral card 86 couples to the host computer system 10 and provides a separate network connection 90 between the communications network 12 and the host computer system 10. Here, however, the second peripheral card 86 only has a capability for transmitting data packets to the communications network 12. The second peripheral card 86 lacks capability of receiving data packets from the communications network 12. The second peripheral card 86 is preferably dynamically-available and has a normally unavailable state. When, however, the second peripheral card 86 is dynamically activated, the second peripheral card may only transmit data packets to the communications network 12. Because the transmit-only second peripheral card 86 is dynamically activated, the second peripheral card 86 can be used to disassociate the rogue client 22. The second peripheral card 86 can be dynamically activated to send a disassociate packet to the rogue client 22, thus disconnecting the rogue client 22 from the communications network 12. The dynamically-available second peripheral card 86 helps reduce susceptibility to denial of service and other rogue "hack" attempts.

The Intrusion Detection Module 26 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Intrusion Detection Module 26 to be easily disseminated. A computer program product for detecting an intrusion to a communications network includes the Intrusion Detection Module 26 stored on the computer-readable medium. The Intrusion Detection Module 26 compares the content of a data packet to a database of registered clients and hosts and to a set of rules. If the data packet satisfies the set 28 of rules, the data packet is ignored. If, however, the data packet fails to satisfy the set of rules, the Intrusion Detection Module triggers an intrusion alert.

The peripheral card 14 may operate within other computer and communications devices. The host computer system 10 may be any computer device, including a laptop, desktop, tablet, server, and other computer systems. Although the peripheral card 14 is shown operating in the host computer system 10, the peripheral card 14 could alternatively operate in other host communications devices. The peripheral card 14, for example, could provide a communications interface between a wireless/wireline communications network and a personal digital assistant (PDA), a Global Positioning System (GPS) device, an interactive television, an Internet Protocol (IP) phone, a pager, a cellular/satellite phone, or any computer and/or communications device utilizing a digital signal processor (DSP). The peripheral card 14 may also operate in addressable watches, radios, modems, vehicles, clocks, printers, gateways, and other apparatuses and systems.

The Intrusion Detection Module 26, likewise, may operate within other computer and communications devices. The Intrusion Detection Module 26 may operate within any computer device, including a laptop, desktop, tablet, server, and other computer systems. The Intrusion Detection Module 26 could also monitor streams of data packets in a personal digital assistant (PDA), a Global Positioning System (GPS) device, an interactive television, an Internet Protocol (IP) phone, a pager, a cellular/satellite phone, or any computer and/or communications device utilizing a digital signal processor (DSP). The Intrusion Detection Module 26 may also operate in addressable watches, radios, modems, vehicles, clocks, printers, gateways, and other apparatuses and systems.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A system, comprising:
    a host computer system;
    a peripheral card coupled to the host computer system, the peripheral card comprising a first interface to a first communications network and a second interface to a second communications network, the first interface comprising a first wireless communications portion and a processor managing the first wireless communications portion, the first wireless communications portion coupled to an antenna and configured for one-way communication to wirelessly receive data packets from the first communications network, the first wireless communications portion lacking a configuration to transmit data to the first communications network, the second interface interfacing with the second communications network; and
    memory coupled to the peripheral card, the peripheral card storing the data packets in the memory, the peripheral card inspecting a header portion and a payload portion of each data packet and comparing the header portion and the payload portion to a set of rules stored in the memory; and
    if the header portion and the payload portion satisfy the set of rules, then the peripheral card ignores a data packet, and if the header portion and the payload portion fail to satisfy the set of rules, then a failure signifies an intrusion event,
    wherein the first interface of the peripheral card reduces intrusion of the first communications network by preventing a download of the data packets from the first communications network and the second communications network.

2. A system according to claim 1, further comprising a second peripheral card coupled to the host computer system, the second peripheral card comprising another communications portion configured only for one-way communication to transmit the data packets via the first communications network, the another communications portion lacking configuration of receiving the data packets via the first communications network, wherein the second peripheral card further reduces intrusion of the second communications network.

3. A system according to claim 2, further comprising a third peripheral card coupled to the host computer system, the third peripheral card comprising a network interface portion to maintain a network connection between the second communications network and the host computer system.

4. A system according to claim 1, further comprising an Intrusion Detection Module stored in the memory that triggers an intrusion alert when the header portion and the payload portion fail to satisfy the set of rules.

5. A system according to claim 4, wherein the memory stores seven rules describing the following seven observations:
    i) ad-hoc communications from a client device,
    ii) a mis-configured access point,
    iii) probing for a service set identifier of the second communications network,
    iv) a rogue access point,
    v) a rogue client device,
    vi) a rogue communications network, and vii) unauthorized conversation between the host communications system and the client device.

6. A system according to claim 1, further comprising a dynamically configurable Intrusion Detection Module stored in the memory, the Intrusion Detection Module containing intrusion detection software that reloads a configuration file without rebooting the host computer system.

7. A system according to claim 1, further comprising a second peripheral card coupled to the host computer system, the second peripheral card comprising a dynamically-available communications portion that is configured for a normally unavailable state, but when dynamically activated the second peripheral card configures for one-way communication to only transmit the data packets to the second communications network, the second peripheral card lacking configuration of receiving the data packets from the first communications network, the second peripheral card further reducing intrusion of the second communications network.

8. A method, comprising:
coupling a host computer system to a peripheral card that comprises a first interface to a first communications network and a second interface to a second communications network, the first interface comprising a first wireless communications portion and a processor managing the communications portion, the first wireless communications portion configured for one-way communication to wirelessly receive data packets from the first communications network and lacking a configuration to transmit data to the first communications network;
wirelessly receiving the data packets at an antenna coupled to the first wireless communications portion, the antenna wirelessly receiving the data packets from the first communications network;
coupling the peripheral card to memory and storing the data packets in the memory;
inspecting a header portion and a payload portion of each data packet and comparing the header portion and the payload portion to a set of rules stored in the memory;
ignoring a data packet when the header portion and the payload portion satisfy the set of rules; and
failing the data packet when the header portion and the payload portion fail to satisfy the set of rules, a failure signifying an intrusion event,
wherein the first interface of the peripheral card reduces intrusion of the first communications network by preventing a download of the data packets from the first communications network and the second communications network.

9. The method according to claim 8, further comprising coupling a second peripheral card to the host computer system, the second peripheral card comprising another communications portion configured for one-way communication to only wirelessly transmit the data packets via the first communications network, the another communications portion lacking configuration to wirelessly receive the data packets via the first communications network, wherein the second peripheral card further reduces intrusion of the second communications network.

10. The method according to claim 8, further comprising coupling a third peripheral card to the host computer system, the third peripheral card comprising a network interface portion to maintain a network connection between the first communications network and the host computer system.

11. The method according to claim 8, further comprising triggering an intrusion alert when the header portion and the payload portion fail to satisfy the set of rules.

12. The method according to claim 11, further comprising storing in the memory seven rules describing the following seven observations:
ad-hoc communications from a client device,
a mis-configured access point,
probing for a service set identifier of the first communications network,
a rogue access point,
a rogue client device,
a rogue communications network, and
unauthorized conversation between the host communications system and the client device.

13. The method according to claim 8, further comprising dynamically configuring an Intrusion Detection Module stored in the memory, the Intrusion Detection Module containing intrusion detection software that reloads a configuration file without rebooting the host computer system.

14. The method according to claim 8, further comprising coupling a second peripheral card to the host computer system, the second peripheral card comprising a dynamically-available communications portion, the second communications portion configured as having a normally unavailable state, but when dynamically activated the second peripheral card configures for one-way communication to only wirelessly transmit the data packets to the second communications network, the second peripheral card lacking configuration to wirelessly receive the data packets from the first communications network, the second peripheral card further reducing intrusion of the second communications network.

15. A computer program product storing processor executable instructions for performing a method, the method comprising:
coupling a host computer system to a peripheral card comprising a first interface to a first communications network and a second interface to a second communications network, the first interface comprising a first wireless communications portion and a processor managing the first wireless communications portion, the first wireless communications portion configured for one-way communication to wirelessly receive data packets from the first communications network, the first wireless communications portion lacking a configuration to transmit data to the first communications network;
wirelessly receiving the data packets at an antenna coupled to the first wireless communications portion, the antenna wirelessly receiving the data packets from the first communications network;
coupling the peripheral card to memory and storing the data packets in the memory;
inspecting a header portion and a payload portion of each data packet and comparing the header portion and the payload portion to a set of rules stored in the memory;
ignoring a received data packet when the header portion and the payload portion satisfy the set of rules; and
failing a data packet when the header portion and the payload portion fail to satisfy the set of rules, a failure signifying an intrusion event,
wherein the first interface of the peripheral card reduces intrusion of the first communications network by preventing a download of the data packets from the first communications network and the second communications network.

16. A computer program product according to claim 15, further comprising storing instructions for seven rules describing the following seven observations:
ad-hoc communications from a client device,
a mis-configured access point, probing for a service set identifier of the first communications network,
a rogue access point,
a rogue client device,
a rogue communications network, and
unauthorized conversation between the host communications system and the client device.

17. A computer program product according to claim 15, further comprising storing instructions for detecting an unauthorized conversation involving i) a known host communicating with an unknown client and ii) a known client communicating with an unknown access point.

18. A computer program product according to claim 15, further comprising storing instructions for triggering an intrusion alert when the header portion and the payload portion fail to satisfy the set of rules.

* * * * *